C. MACKH.
Meat-Roaster.

No. 204,590.  Patented June 4, 1878.

Witnesses:
Henry J. Bruns.
Jacob Richter.

Inventor:
Charles Mackh
by Wm H Lotz
his Attorney

UNITED STATES PATENT OFFICE.

CHARLES MACKH, OF ELGIN, ILLINOIS, ASSIGNOR OF ONE-HALF HIS RIGHT TO O. P. CHISHOLM, OF SAME PLACE.

IMPROVEMENT IN MEAT-ROASTERS.

Specification forming part of Letters Patent No. 204,590, dated June 4, 1878; application filed March 23, 1878.

*To all whom it may concern:*

Be it known that I, CHARLES MACKH, of Elgin, in the county of Kane and State of Illinois, have invented a new and Improved Meat-Roasting Apparatus, as fully set forth in the following specification.

My invention consists in the roasting-vessel composed of the triangular prismatic body, provided with handles and carrying the removable grate and gravy-pan, and the cover, shaped like the body and hinged thereto, and having a folding leg to support the cover in an open position, and venting-disks, which can be turned to either open or close the vent-openings.

The meat to be roasted being put upon the grate, the apparatus is closed and placed in an oven.

Figure 1:
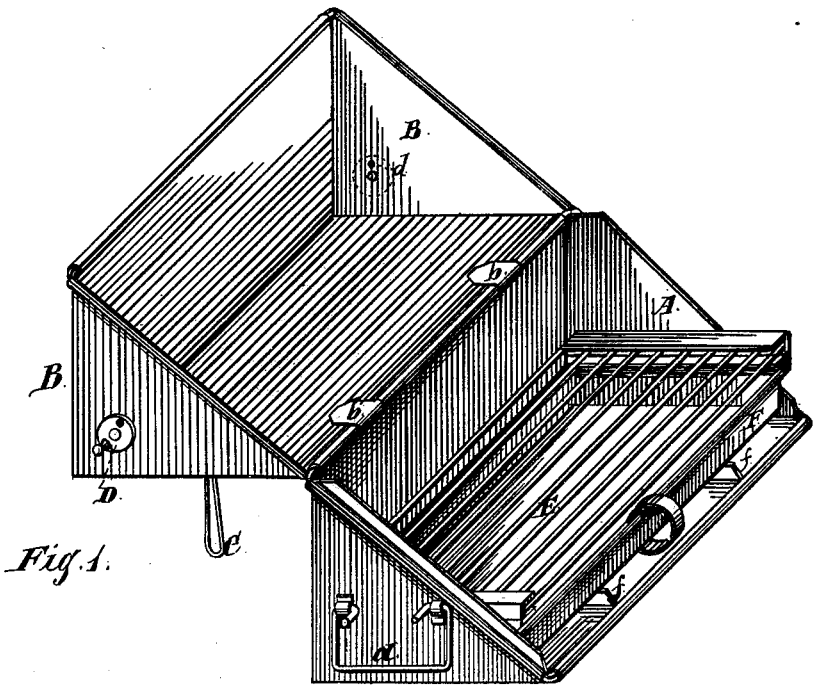
Figure 2:
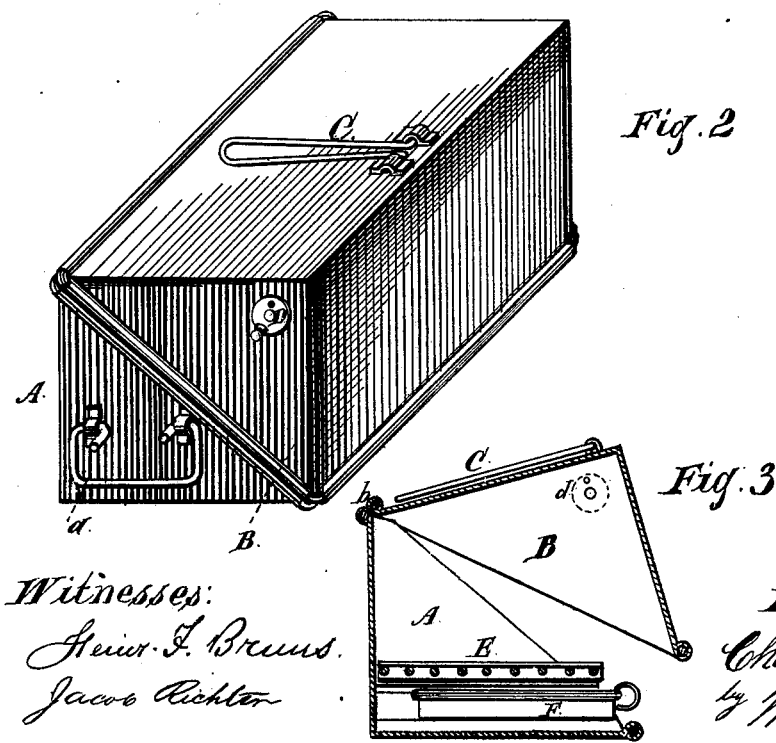
Figure 3:
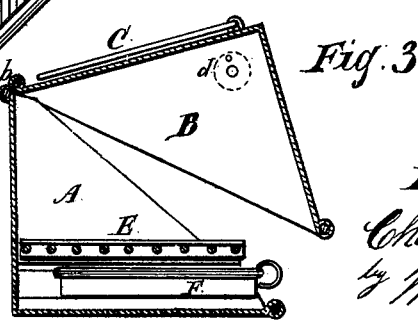

In the drawing, Figure 1 represents a perspective view of the roasting apparatus with its lid open. Fig. 2 represents a similar view of the same while closed; and Fig. 3 represents a transverse section, showing the lid partly opened and the gravy-pan partly drawn out.

A is the body-section of the vessel, having a triangular prismatic shape, and being open on top, with wire-bound edges and projecting lid-joining flanges, and with folding handles *a* at its ends. B is the lid-section, similarly shaped, and connected with the body-section A by hinges *c*, so that the whole vessel, when closed, has the shape of a square prism. The leg C is pivoted upon the top of the lid, so as to lie flat upon it, and to act as a support for said lid while swung open, when it will form a shelf, as represented in Fig. 1. Against the end walls of the cover B are secured, by a rivet each, small disks D, so as to rotate, having openings which correspond with vents *d* cut through the wall of the lid, so that these vents can be opened or closed by turning the disk. E is a removable grate, resting upon flanges formed against the inward end walls of the vessel at such an elevation from the bottom of the vessel that a gravy-pan, F, can be placed thereunder, which is rested upon cleats *f* projecting from the bottom of said vessel, and upon which it can be moved in or out like a drawer.

For using this apparatus, the meat or fowl is put upon the grate, adding a little butter or lard and the usual spices, and filling the gravy-pan partly with water. After the lid is closed over the meat and the vents are shut the vessel is placed in the baking-oven, where it is kept long enough to bake the meat. If the meat is to receive a browning, the vents are to be opened for the vapor to exhaust, when a more dry heat is produced.

By the use of the above-described apparatus, the meat being shut up therein almost hermetically, all of the vapors and flavors are retained, and thereby no crust can form on the outside of the meats, as there is a continuous rising of the vapors, which will condense under the top of the vessel, and will fall in drops again upon the meat.

This apparatus is also well adapted for baking potatoes and for keeping meals warm, and its construction and arrangement are such that easy access can be had to the meats and gravy.

What I claim as my invention is—

The roasting-vessel described, consisting of the triangular prismatic body A, provided with handles *a*, and carrying the removable grate E and gravy-pan F, and the cover B, shaped like the body and hinged thereto, and having the folding leg C and the venting-disks D, constructed and arranged substantially as described and shown.

CHARLES MACKH.

Witnesses:
O. P. CHISHOLM,
J. L. ABELL.